United States Patent [19]

Haussels

[11] 3,911,525
[45] Oct. 14, 1975

[54] CASTOR, PARTICULARLY FOR HOSPITAL BEDS

[75] Inventor: Berthold Haussels, Wermelskirchen, Germany

[73] Assignee: Firma Acousa Saxon, S.A., Germany

[22] Filed: Aug. 26, 1974

[21] Appl. No.: 500,535

[30] Foreign Application Priority Data
Sept. 1, 1973 Germany............................ 2344208

[52] U.S. Cl.................................. 16/35 R; 16/351
[51] Int. Cl.$^2$......................................... B60B 33/00
[58] Field of Search.......... 16/35 R, 35 D, 18 R, 19, 16/29, 30, 37, 38, 31 R, 31 A, 32, 34

[56] References Cited
UNITED STATES PATENTS
| | | | |
|---|---|---|---|
| 3,162,888 | 12/1964 | Miöbus............................... | 16/35 R |
| 3,705,438 | 12/1972 | Stosberg et al...................... | 16/35 R |
| 3,828,392 | 8/1974 | Bolger................................ | 16/35 R |

Primary Examiner—Geo. V. Larkin
Attorney, Agent, or Firm—Neuman, Williams, Anderson & Olson

[57] ABSTRACT

A centrally locatable castor, particularly for hospital beds, with a fixing pin for mounting at the foot of a bed and carrying a castor fork and a roller by means of a ball bearing, having a polyhedral adjusting bolt which is carried axially through and non-rotatably in the fixing pin and which can be moved axially by means of a central adjusting linkage against the influence of a counter-spring which urges the bolt towards it upper position, the adjusting bolt having at its bottom end an adjusting disc projecting into the castor fork and engaging at a predetermined position of the adjusting bolt with a direction control member which prevents displacement due to swivelling and engaging at the lowest position with a brake unit freely mounted in the fork for preventing both displacement by swivelling and also movement of the roller, wherein a brake unit is provided which encloses an adjusting disc below and at the side and also encloses a counter-disc located under and arranged for engagement with the adjusting disc, a retaining spring being arranged for holding the brake unit and being located in a position of constant contact with either the back of the castor fork or the adjusting disc.

13 Claims, 4 Drawing Figures

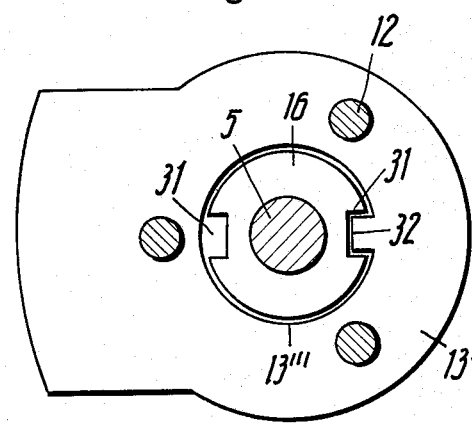
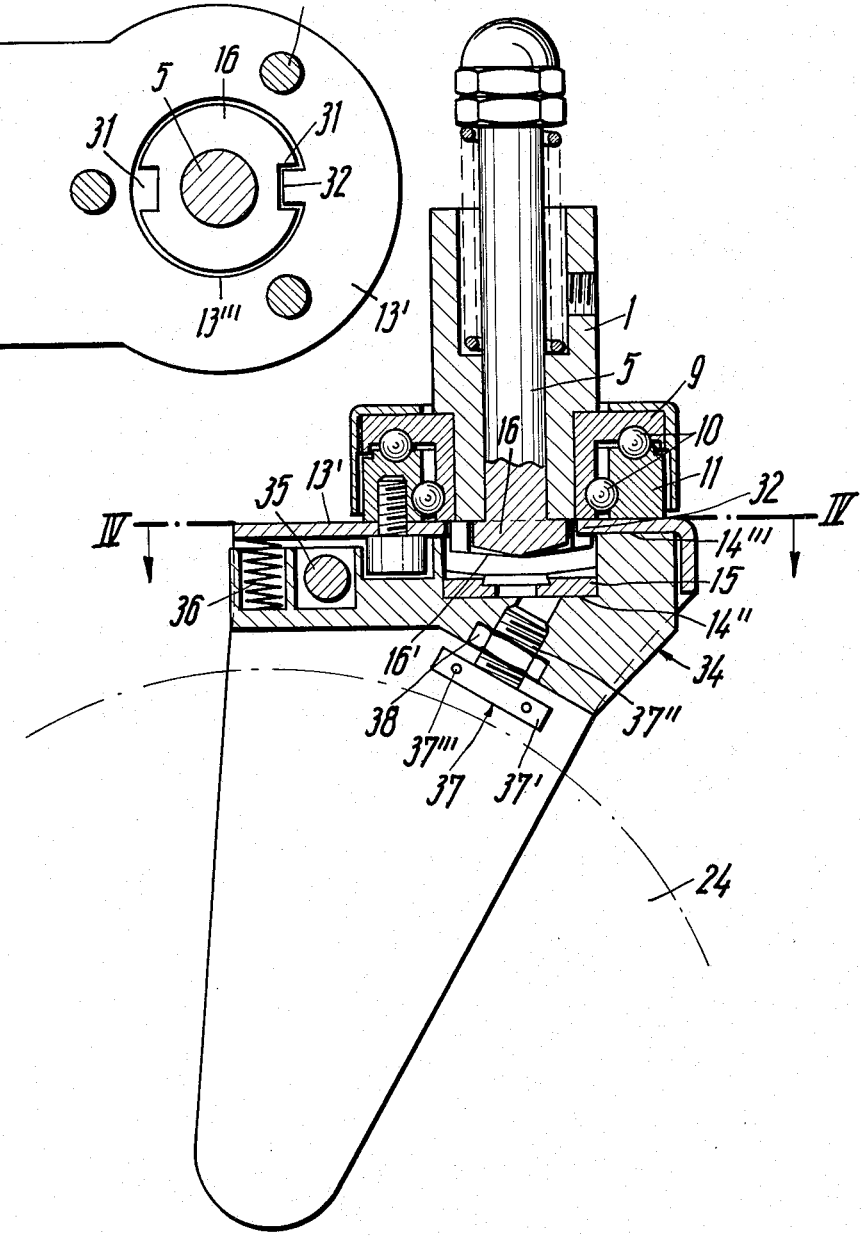

CASTOR, PARTICULARLY FOR HOSPITAL BEDS

FIELD OF THE INVENTION

The invention concerns a centrally locatable castor roller, particularly for mobile hospital beds, with a fixing pin arranged to be mounted at the foot of the bed frame and carrying the castor fork and the wheel or roller by means of a ball bearing, with a polyhedral adjusting bolt which is carried axially through, but cannot turn in, the fixing pin and which can be moved axially by means of a central adjusting linkage against the influence of a counter spring which tends to keep the bolt in its upper position, the adjusting bolt having at its bottom end an adjusting disc projecting into the hollow space of the castor fork and engaging, at a predetermined position of the adjusting bolt, with a direction control member, which prevents displacement due to swivelling, and also engaging, at the lowest position, with a brake unit freely mounted in the fork space, which thereby prevents displacement by swivelling and also movement of the roller. Thus, not only can swivelling movement of the fork and rotating movement the roller be simultaneously prevented in such castors, but also at a certain position of the polyhedral adjusting bolt the castor fork alone can be stopped in its swivelling motion, namely by the so-called direction control member. In this way, difficulties which would otherwise arise from the independent mobility of the castors during lengthy straight journeys of hospital beds or the like are thereby avoided, since the bed retains its selected direction of travel, the castors being located in that direction, even when being pushed in front of someone.

Both the brake unit and the direction control member of known centrally locatable castors of the above type consist of locking latches mounted so as to be free to swivel at one side of the space in the castor fork. While the locking latch serving to control direction is under the influence of a spring, the brake unit latch for holding the castor roller lies freely on the circumference of the roller. If the adjusting bolt is moved downwards, its adjusting disc, which is of mushroom shape and is equipped with teeth, first meets the direction-controlling locking latch, which then engages with a corresponding cut-out on the toothed adjusting disc and thus prevents swivelling movement of the castor fork. On being moved further down, the toothed adjusting disc meets the brake unit latch, which thus becomes pressed firmly against the circumference of the roller, braking of the roller thus being effected. The most disadvantageous feature of these previously known castors with a latch-like structure of both the brake unit and the direction control member is that these parts demand a rather large amount of room for their accommodation in the fork and, in addition, they are inclined to rattle. They can also easily get dirty. Lastly, these latch-like parts are easily accessible from outside and so entail an increased risk of jamming.

SUMMARY OF THE INVENTION

The invention is therefore based on the problem of providing a centrally fixable castor, intended in particular for mobile hospital beds, which does not have the abovementioned disadvantages, but rather, in respect of the fixing mechanism to be accommodated in the fork, is a very firm, sound and above all compact structure and is consequently and to the greatest extent possible is not liable to contamination with dirt and to difficulty of access. Starting from a castor of the type mentioned at the beginning, this task is accomplished according to the invention in that the brake unit encloses the adjusting disc below and at the side, includes a counter-disc situated below and engageable with the adjusting disc and is held by a retaining spring in constant contact either with the rear of the castor fork or with the adjusting disc. A compact rattle-free structure is thus arrived at, in which the brake unit containing the counter-disc fills the space available to it in the best possible manner, while at the same time obvious jamming points are avoided.

An even firmer and more compact castor structure is achieved according to a preferred further feature of the invention in that the ball bearing mounted between the fixing pin and the back of the fork consists of a combined axial and radial bearing with an inner ring having an L-shaped section which encloses an outer ring of rectangular section. The inner ring rests on an annular shoulder formed round the fixing pin and the outer ring is fastened to the back of the castor fork by cap screws, over the heads of which, projecting down into the fork itself extends the brake unit, which is equipped with corresponding axially drilled holes. Owing to the combined axial and radial ball bearing a very favourable development is given, from the standpoint of power transmission, of the swivelling bearing connection between the fixing pin and the castor fork, this connection being at the same time very compact and not projecting disturbingly into view. This also applies to the brake unit situated under the back of the castor fork; it continues, as it were, the outline of the combined axial and radial ball bearing located above it, and so with that has outwardly the effect of a compact component.

The adjusting disc is suitably provided in known manner with a toothed conical surface, while the counter-disc has corresponding conical toothing and is non-rotatably lodged in a cut-out in the face of the brake unit.

In accordance with a further preferred feature of the invention, the brake unit can be formed as a brake slide movably mounted in the castor fork, with its axis parallel to the adjusting bolt, and a spring bolt, which is axially movable and projects towards the adjusting disc, can be mounted as the direction controller in the counter-disc located in the brake unit, the spring bolt being engageable with one or more cut-outs provided in the adjusting disc. The spring acting on the spring bolt is advantageously located in an axially-drilled well provided in the brake slide. Both the spring bolt serving as the direction controller and the two toothed discs are enclosed by the brake slide which surrounds them and consequently are to the greatest extent free of dirt and jamming.

In a particularly advantageous form of the invention, the adjusting disc has a cut-out in its circumference which, in its highest position, fits over a radial projection mounted on the back of the castor fork and serving as a direction control member, while in its middle position it does not engage with this projection. A simple and sound type of structure is achieved in this way, particularly also in respect of directional control. In this case, the brake unit can also usefully be mounted with freedom to swivel and can be pressed against the back of the castor fork by means of a supporting spring located between itself and the back of the fork.

BRIEF DESCRIPTION OF THE DRAWINGS

Further features and advantages of the invention are described below in conjunction with three embodiments illustrated in the accompanying drawings, wherein:

FIG. 3 shows a third preferred embodiment, and

FIG. 4 shows a section of the line IV—IV in FIG. 3.

DESCRIPTION OF THE PREFERRED EMBODIMENTS

Figure 1:
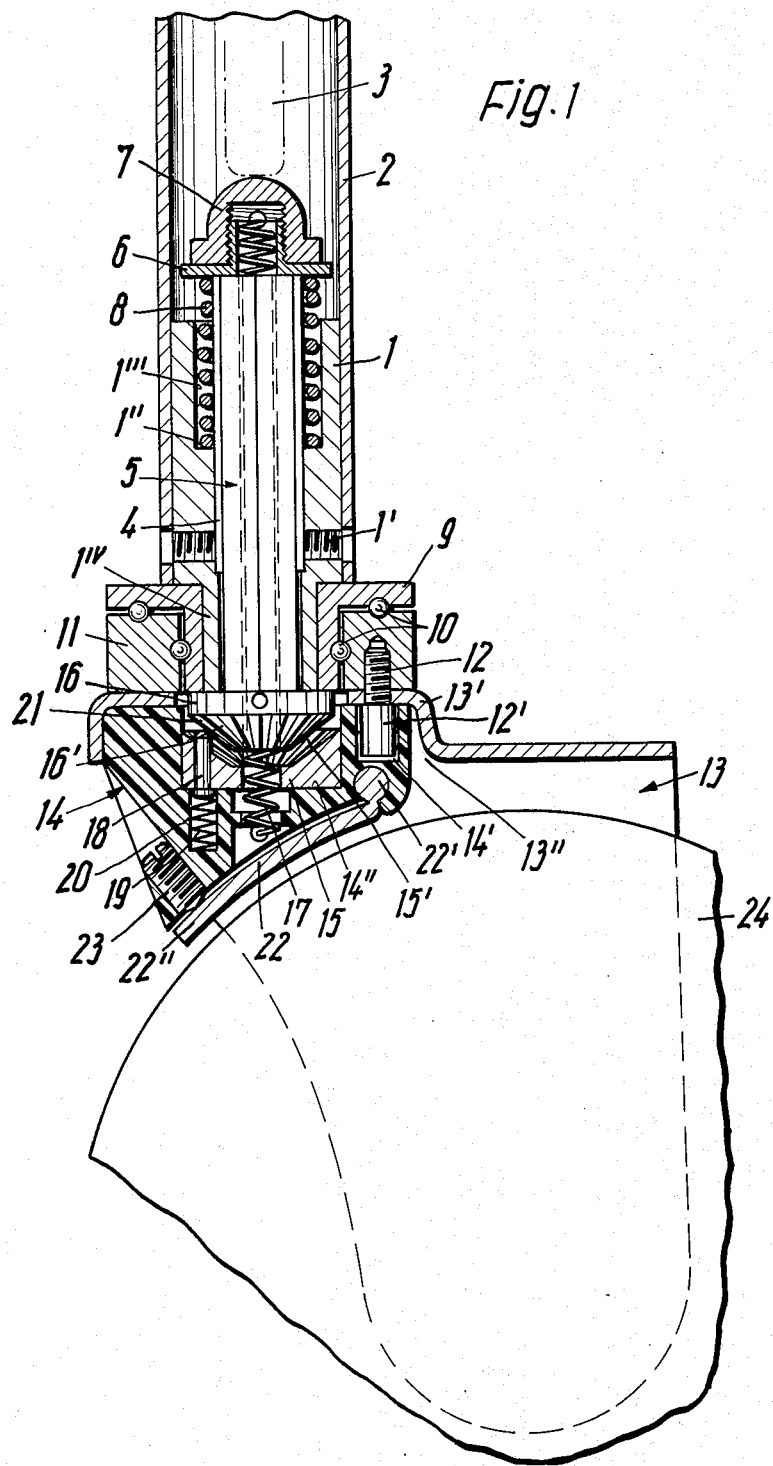
FIG. 1 shows a vertical longitudinal section through a first embodiment of the centrally fixable castor of the invention.

The castor shown in FIG. 1 is located by means of a fixing pin 1 in the tubular foot 2 of a hospital bedstead, of which no more is shown and which is provided in known manner with a central adjusting linkage, of which only a linkage bolt 3, projecting into the bedstead foot 2, is indicated in broken lines. The fixing pin 1 can be secured to the bedstead foot 2 by means of fixing screws which are inserted into threaded holes 1'. An adjusting bolt 5, preferably hexagonal in shape, is carried in an axial bore 4 through the fixing pin 1 so that it can be moved axially but cannot be turned. The bolt 5 is provided at its upper end with a washer 6 covered by a cap nut 7, which serves for power transmission from the central adjusting linkage or from its bolt 3 to the adjusting bolt 5. A helical spring 8 is supported above on the washer or bushing 6 and below on a shoulder 1'' formed by the widened bore 1''' in the fixing pin 1; this spring 8 surrounds the upper part of the bolt 5. The spring 8 tends to retain the adjusting bolt 5 in its upper release position, which is shown.

An inner ring 9, with an L-shaped profile or section, of a combined axial and radial roller bearing 10 is screwed or fixed in some other way on a lower dependent skirt-like part 1$^{IV}$ incorporated in the fixing pin 1. An outer ring 11 of the combined axial and radial roller bearing 10 is cut to a rectangular profile and is fitted into the profile of the inner ring 9, so that a very compact and strong form of swivel bearing is obtained. The outer ring 11 is firmly and directly joined to the back 13' of a castor fork 13 by means of several, preferably three, cap screws 12 arranged at equal distances from each other and, by this means, favourable power transmission is given by the shortest possible path from the castor fork 13 to the fixing pin 1 and vice versa.

A brake unit 14, preferably consisting of synthetic material, is accommodated in the space 13'' in the castor fork 13. It is formed here as an axially movable brake slide. The heads 12' of the fixing screws 12 extend into corresponding drilled wells or recesses 14' in the brake member itself and serve to guide it axially. The brake member or slide 14 is also provided with a central well 14'' in which a counter-disc 15 is immovably and non-rotatably mounted. The counter-disc 15 is provided with a toothed conical surface 15'. This can be caused to engage with correspondingly shaped and toothed conical surface 16' of an adjusting disc 16, which is firmly fixed at the bottom end of the adjusting bolt 5. The brake slide 14 is held by a retaining spring 17 which engages it and is secured at its lower end to the brake slide 14 and also passes through the brake slide 14, the counter-disc 15 located in it, the adjusting disc 16 and the correspondingly bored polyhedral adjusting bolt 5, the top of the spring 17 being secured to the bushing 6. A spring bolt 18, which is mounted with a limited range of axial movement, is located in the counter-disc 15 in a corresponding axial bore. The spring bolt 18 is under the influence of a spring 19 housed in a corresponding drilled recess 20 in the brake slide 14. The spring bolt 18 cooperates with one or more of the indexing cavities 21 formed in the adjusting disc 16.

A brake shoe 22 is provided on the underside of the brake slide 14 and is made as a clamping hinge flap and is held with its bead 22' clamped in a corresponding transverse bore formed in the brake slide 14. An adjusting screw 23, by which the brake shoe 22 can be appropriately set and which is mounted in a corresponding threaded hole in the brake slide 14, engages with the free end 22'' of the shoe 22.

In the release position of the polyhedral adjusting bolt 5, as shown, the castor fork 13 can be freely swung about the vertical axis running through the middle of the fixing pin 1. The roller 24 in the fork 13 can also turn freely. If the hospital bed is to be pushed straight ahead for a long journey, directional control can usefully be employed. For this purpose, the adjusting bolt 5 is pushed by means of the central adjusting linkage to a median lower position in which the spring bolt 18 can engage with a locking cavity 21 in the adjusting disc 16; the cavity or cut-out is located in a position appropriate to the direction desired. That will not usually be the case without further action. Rather, the spring bolt 18 will be pressed back first against the action of its spring 20 by appropriately pressing down the adjusting disc 16 until, with the appropriate direction (e.g. the position for travel straight ahead) being arranged for, the spring bolt 18 is urged into the locking cut-out 21 and thus prevents swivelling motion of the fork 13. If the hospital bed is to be finally fixedly located on reaching its destination, the adjusting bolt 5 is pressed further down by suitable activation of the central linkage, so that the toothed conical surface 16' of the adjusting disc 16 moves against the correspondingly toothed counter-surface 15' of the counter-disc 15, moving the brake slide 14 axially and finally pressing it with its brake shoe 22 against the circumference of the roller 24, thus braking its rotational movement. Displacement of the castor fork 13 by swivelling has also been securely prevented by the simultaneous interengagement of the toothed conical surfaces 16' and 15' between the two discs 16, 15. As soon as the central adjusting linkage has been suitably activated for the hospital bed to travel and the linkage bolt 3 has thus returned to its upper position, the adjusting bolt actuated by the counter-spring 8 also returns to its upper release position, in which the two discs 15, 16 become entirely disengaged, so that the castor fork 13 can be freely swivelled and the roller 24 freely turned.

Figure 2:
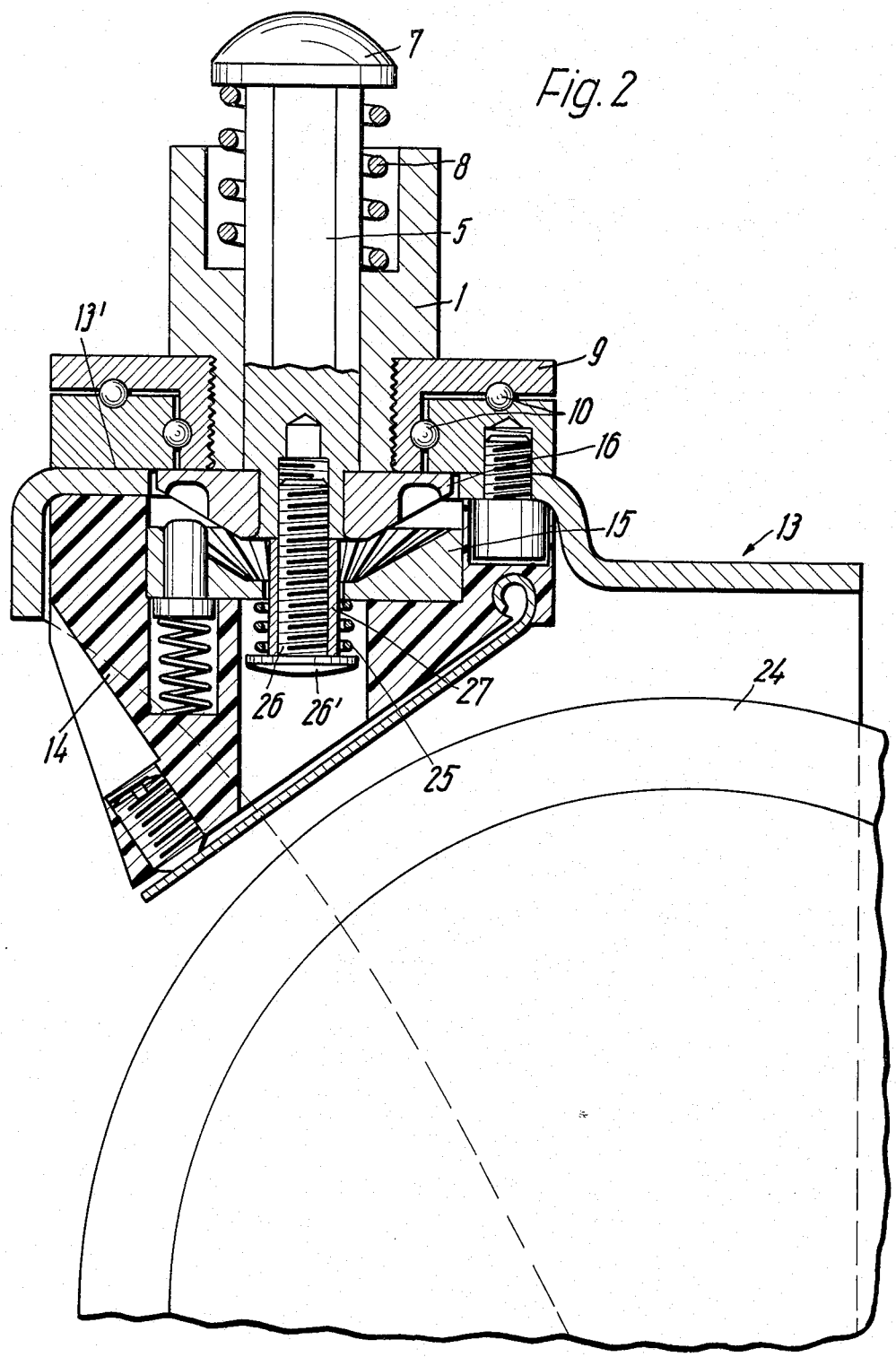
FIG. 2 shows a corresponding section through a second embodiment of the castor.

In essentials, the castor represented in FIG. 2 is distinguished from the one shown in FIG. 1 only by the different type of structure and arrangement of its retaining spring 25, which keeps the brake slide 14 constantly in position to contact either the back 13' of the castor fork or the adjusting disc 16. This spring is dealt with briefly here by way of comparison. It is supported on the one hand on the head 26' of a screw 26, which is screwed into the lower end of the polyhedral adjusting bolt 5, while it is supported at the other end on the counter-disc 15 located above it in the brake slide 14. The retaining screw is also surrounded by a spacer sleeve 27, which is supported above on the end face of the polyhedral adjusting bolt 5, and below on the head 26' of the retaining screw. Most importantly, this embodiment, as compared with that shown in FIG. 1, has the advantage that it is easier to manufacture and leaves the adjusting bolt 5 unweakened.

It is obvious that within the framework of the present invention many variations are possible. In particular, the new centrally fixable castor is also suitable not only for hospital beds but also for other mobile pieces of furniture, equipment and the like, which can be fitted with a suitable central adjusting linkage.

FIGS. 3 and 4 show a preferred embodiment of the invention. Differing from the embodiments hitherto described, the polyhedral adjusting bolt 5, shown with its adjusting disc 16 in the uppermost position, is employed here as a direction control member. To this end, the adjusting disc 16, as FIG. 4 in particular shows, is provided on the circumference with two cut-outs separated by 180°, while on the back 13' of the castor fork a radial projection 32 is provided and extends into the aperture 13''' for the adjusting disc 16. By this means, the ability of the castor fork 13 to move by swivelling in directions determined by the cut-outs 31, which regularly correspond to the direction of travel, is prevented and therefore a suitable directional control of the castor is effected. The adjusting bolt 5 with its adjusting disc 16 must here be moved downwards to a middle position for releasing the directional control arrangement. In this middle position, the adjusting disc disengages its circumference from the radial projection 32 so that the castor fork 13 can be freely swivelled about its vertical axis in this position.

The brake unit 34 in this case is mounted so as to be free to swivel on a bolt 35 located close under the back 13' of the castor fork 13. With its upper side 14''' which surrounds the cut-out 14' holding the counter-disc 15, it is pressed against the underside of the back 13' of the castor fork by a supporting spring 36, which is mounted between it and the back of the castor fork. An adjusting screw 37 is mounted on the underside of the swivelling brake unit 34 at the height of its cut-out 14'' and this screw forms the actual brake shoe with its head 37' which projects down from the brake unit 34. The threaded shank 37'' of the adjusting screw 37 is located in a metal nut 38, which is pressed into the brake unit 34, which consists of synthetic material, e.g. a polyamide. The brake forces exerted on the brake shoe 37' by the roller 24 when it is braked can be better carried over to the brake unit 34 by this means. In order to prevent self-actuated twisting of the adjusting screw 37 in the nut 38, the adjusting screw and the rest of its threaded shank 37'' pass right into the synthetic material of the brake unit 34, so that suitable self-locking occurs. With the aid of a key to be inserted into holes 37''', the adjusting screw 37 can be adjusted in accordance with the actual size of the roller 24 or its dimensional relationship.

In order to prevent swivelling and rotational movement of the castor roller 24, the adjusting bolt 5 with its adjusting disc 16 is also urged into the lowest position by means of the central adjusting linkage, while teeth 16' on the underside of the adjusting disc 16 engage with the correspondingly toothed upper side of the counter-disc 15, which is non-rotatably mounted in the brake unit 34, so that swivelling of the castor fork 13 is prevented. At the same time however, the brake unit 34 is swung down about the bolt 35 until the brake shoe 37' rests firmly on the circumference of the roller 24. Rotation of the roller is thus prevented.

For the rest, in the embodiment shown in FIGS. 3 and 4, the advantages obtainable by the use of combined axial and radial ball bearings 10 with both rings 9 and 11 are fully available and altogether they lead to a compact, firm structure and, in particular, to favourable transmission of power between the fixing pin 1 and the castor fork 13.

I claim:

1. A centrally locatable castor, particularly for hospital beds, with a fixing pin for mounting at the foot of a bed and carrying a castor fork and a roller by means of a ball bearing, having a polyhedral adjusting bolt which is carried axially through and non-rotatably in the fixing pin and which can be moved axially by means of a central adjusting linkage against the influence of a counter-spring which urges the bolt towards its upper position, the adjusting bolt having at its bottom end an adjusting disc projecting into the castor fork and engaging at a predetermined position of the adjusting bolt with a direction control member which prevents displacement due to swivelling and engaging at the lowest position with a brake unit freely mounted in the fork for preventing both displacement by swivelling and also movement of the roller, wherein a brake unit is provided which encloses an adjusting disc below and at the side and also encloses a counter-disc located under and arranged for engagement with the adjusting disc, a retaining spring being arranged for holding the brake unit and being located in a position of constant contact with either the back of the castor fork or the adjusting disc.

2. A castor in accordance with claim 1, wherein the ball bearing between the fixing pin and the back of the castor fork consists of a combined axial and radial bearing with an inner ring of L-shaped section in which an outer ring of rectangular section is enclosed, wherein the inner ring rests on a shoulder formed round the fixing pin and outer ring being fixed to the back of the castor fork by cap screws and wherein a brake unit provided with corresponding axial wells is secured over the heads of such cap screws within the castor fork.

3. A castor in accordance with claim 2 wherein the brake unit is constructed as a brake slide movably mounted in the castor fork with its axis parallel to the adjusting bolt and with the counter-disc located therein, an axially-movable spring bolt serving as a directional control member being mounted for engagement with one or more directional recesses provided in the adjusting disc.

4. A castor in accordance with claim 3, wherein a spring associated with the spring bolt is accommodated in a well formed in the brake slide.

5. A castor in accordance with claim 3 wherein the brake slide carries an interchangeable brake shoe at its lower end which cooperates with an adjusting screw mounted in the brake slide.

6. A castor in accordance with claim 3, wherein the brake slide is secured to one end of a retaining spring which passes through the brake slide, the counter disc, the adjusting disc and the polyhedral adjusting bolt and is fixed at its other end to a bushing located against the adjusting bolt the bushing being covered by a cap nut which at the same time effects power transmission from a central adjusting linkage to the adjusting bolt.

7. A castor in accordance with claim 3, wherein a retaining screw is provided at the bottom end of the polyhedral adjusting bolt and passes through the counter disc, the screw carrying a retaining spring supported between a flange on the retaining screw and the counter disc.

8. A castor in accordance with claim 7, wherein a spacer sleeve is mounted round the shank of the retaining screw and is located between the flange and the lower end of the polyhedral adjusting bolt.

9. A castor in accordance with claim 1, wherein the adjusting disc is provided with a toothed conical surface and the counter-disc has corresponding conical toothing and is non-rotatably housed in a recess provided in the face of brake unit.

10. A castor in accordance with claim 1 wherein the adjusting disc has a cut-out in its circumference arranged to engage in its uppermost position with a radial projection located on the back of the castor fork and serving as a direction control member, the disc in its middle position being disengaged from the projection.

11. A castor in accordance with claim 10, wherein the brake unit is freely mounted on a bolt located closely under the back of the castor fork, the upper side of the brake unit enclosing the cut-out and being urged against the back of the castor fork by a support spring located between it and the back of the castor fork.

12. A castor in accordance with claim 10, wherein the adjusting screw is mounted on the underside of the brake unit at the height of the cut-out and its head extending down from the brake unit forms the actual brake shoe.

13. A castor in accordance with claim 12, wherein the brake unit consists of synthetic material and the threaded shank of the adjusting screw is both carried in a metal nut pressed into the synthetic material and extends in a self-locking manner into the synthetic material beyond the nut.

* * * * *